(12) United States Patent
Mittal et al.

(10) Patent No.: US 8,488,618 B1
(45) Date of Patent: Jul. 16, 2013

(54) DUAL-CONNECT SERVICE BOX WITH ROUTER BYPASS

(75) Inventors: Millind Mittal, Palo Alto, CA (US); Robert James Fanfelle, Woodside, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 522 days.

(21) Appl. No.: 12/769,540

(22) Filed: Apr. 28, 2010

(51) Int. Cl.
*H04L 12/28* (2006.01)
(52) U.S. Cl.
USPC .......................................... 370/401; 709/229
(58) Field of Classification Search
USPC .......................................... 370/401; 709/229
See application file for complete search history.

(56) References Cited

U.S. PATENT DOCUMENTS

| 2007/0211705 A1* | 9/2007 | Sunstrum ...................... 370/356 |
| 2008/0109871 A1* | 5/2008 | Jacobs .............................. 726/1 |
| 2009/0042513 A1* | 2/2009 | Woosnam ....................... 455/68 |
| 2009/0157888 A1* | 6/2009 | Demmer et al. .............. 709/229 |

* cited by examiner

*Primary Examiner* — Wei Zhao
(74) *Attorney, Agent, or Firm* — Turocy & Watson, LLP (57) ABSTRACT

A system and method provide both inline services and in-network services for a dual-connect service box interposed between a modem and a router. The method transceives communications between a service box wide area network (WAN) port and a local area network (LAN) port of a WAN-connected broadband modem, and between a service box WAN-proxy port and a WAN port of a router. The method also selectively transceives communications between the service box WAN port and a LAN port. A service box binding module monitors messages transceived between the router and the modem to determine the service box WAN IP address, and registers at least one service box WAN IP addresses with a WAN network-connected account server. The method selectively transceives communications in response to an authentication means, which may be identifying an authorized port number in the communications, or identifying an authorized command in the communications.

21 Claims, 7 Drawing Sheets

| SERVICE BOX WAN IP ADDRESS | AUTHORIZATION MEANS | SERVICE TYPE COMMAND | |
|---|---|---|---|

MESSAGE

Fig. 10

WATCH LIST 1002

| SERVICE BOX WAN IP ADDRESS | SERVICES | AUTHEN-TICATION MEANS | SERVICE COMMAND | SERVICE BOX EXTERNAL LAN IP ADDRESS |
|---|---|---|---|---|
| 67.124.10.2 | STORAGE DEVICE 1 | PORT 80 | 0001 | 192.168.1.2 |
| 67.124.10.3 | STORAGE DEVICE 2 | PORT 80 | 0010 | 192.168.1.3 |
|  |  |  |  |  |
| 67.124.10.4 | VPN | PORT 17 | 1000 | 192.168.1.4 |

ACCOUNT MANAGER 1000

MEMORY 1004

SERVER 810

Fig. 11

DUAL-CONNECT SERVICE BOX WITH ROUTER BYPASS

BACKGROUND OF THE INVENTION

1. Field of the Invention

This invention generally relates to computer networking and, more particularly, to a system and method that permits a wide area network (WAN) to be selectively connected to a local area network (LAN) using an inter-network router bypass.

2. Description of the Related Art

As noted in Wikipedia, a wide area network (WAN) is a computer network that covers a broad area (i.e., any network whose communications links cross metropolitan, regional, or national boundaries). This distinction is in contrast to personal area networks (PANs), local area networks (LANs), campus area networks (CANs), or metropolitan area networks (MANs) which are usually limited to a room, building, campus or specific metropolitan area, respectively.

WANs are used to connect LANs and other types of networks together, so that users and computers in one location can communicate with users and computers in other locations. Many WANs are built for one particular organization and are private. Others, built by Internet service providers, provide connections from an organization's LAN to the Internet. WANs are often built using leased lines. At each end of the leased line, a router connects to the LAN on one side and a hub within the WAN on the other. Leased lines can be very expensive. Instead of using leased lines, WANs can also be built using less costly circuit switching or packet switching methods. Network protocols including TCP/IP deliver transport and addressing functions. Protocols including Packet over SONET/SDH, MPLS, ATM and Frame relay are often used by service providers to deliver the links that are used in WANs. X.25 was an important early WAN protocol, and is often considered to be the "grandfather" of Frame Relay as many of the underlying protocols and functions of X.25 are still in use today (with upgrades) by Frame Relay.

A router is an electronic device used to connect two or more computers or other electronic devices to each other, and usually to the Internet (i.e. WAN), by wire or radio signals. A router permits several computers to communicate with each other and to the Internet at the same time. If wired, each computer is connected by its own wire to the router. Modern wired-only routers designed for the home or small business typically have one "input" (WAN) port (to the Internet) and four "output" (LAN) ports, one or more of which can be connected to other computers. A typical modern home wireless router, in addition to having four wired ports, also allows several devices to connect with it wirelessly. Most modern personal computers are built with a wired port (almost always an Ethernet type), which allows them to connect to a router with the addition of just a cable (typically a Category 5e type).

More technically, a router is a networking device whose software and hardware are usually tailored to the tasks of routing and forwarding information. Routers connect two or more logical subnets, which do not necessarily map one-to-one to the physical interfaces of the router.

Residential gateways (often called routers) are frequently used in homes to connect to a broadband service, such as IP over cable or DSL. Such a router may also include an internal DSL or cable modem. Residential gateways and SOHO routers typically provide network address translation and port address translation in addition to routing. Instead of directly presenting the IP addresses of local computers to the remote network, such a residential gateway makes multiple local computers appear to be a single computer. Thus, it is difficult for a remote (WAN-connected) client to connect to a particular computer or LAN agent in a LAN network.

In providing connectivity to external networks, the router's functionality must be carefully considered as part of the overall security architecture. A router may include Firewall functions and a virtual private network (VPN) concentrator.

Generally, a modem (modulator-demodulator) is a device that modulates an analog carrier signal to encode digital information, and also demodulates such a carrier signal to decode the transmitted information. The types of fast modems used by Internet users are cable, ADSL, and broadband modems. In telecommunications, wide-band radio modems transmit repeating frames of data at very high data rates over microwave radio links. Some microwave modems transmit more than a hundred million bits per second. Optical modems transmit data over optical fibers. Optical modems routinely have data rates in excess of a billion ($1 \times 10^9$) bits per second. A 56 k modem can transfer data at up to 56,000 bit/s (7 kB/s) over the phone line.

Figure 1:
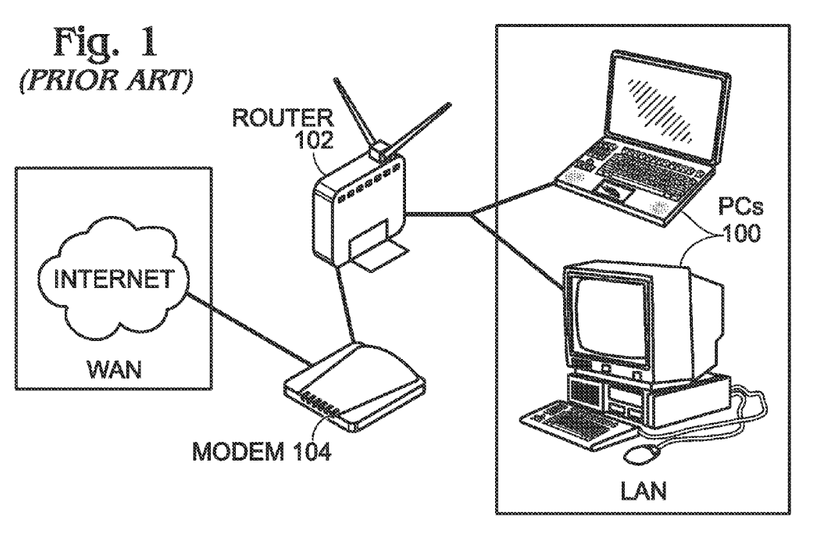
FIG. 1 is a schematic block diagram depicting a home network (LAN) with one or more client PCs 100 and a gateway/router device 102 that connects to a DSL or cable modem 104 (prior art).

FIG. 1 is a schematic block diagram depicting a home network (LAN) with one or more client PCs 100 and a gateway/router device 102 that connects to a DSL or cable modem 104 (prior art).

Figure 2:
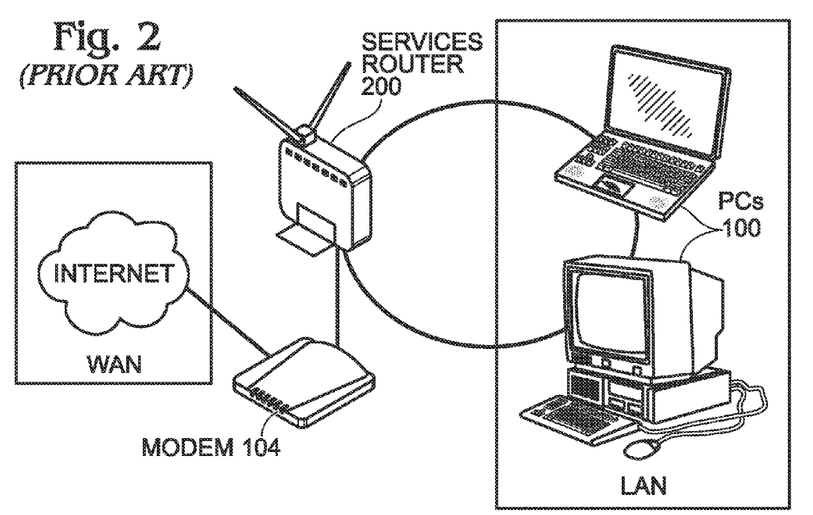
FIG. 2 is a schematic block diagram depicting a first option for adding services to the basic home network of FIG. 1 (prior art).

FIG. 2 is a schematic block diagram depicting a first option for adding services to the basic home network of FIG. 1 (prior art). In this aspect, the router of FIG. 1 is replaced with a services router 200. The services router 200 can be augmented to supply additional inline security, such as IPS, virus scanning, content inspection, and URL filtering, in addition the security features supplied by conventional routers. In addition, the router supplies a service that is conventionally supplied by an agent of the LAN network. One example of such a service is network-attached storage (NAS). Advantageously, the service is always available to a WAN connected device. However, the introduction of such a unique device would require significant start-up costs. The servicing and support services may also be expensive. Further, there may have problems installing and using such a complex networking device. The typical user wants their networking device to be simple, cheap, and failure proof.

Figure 3:
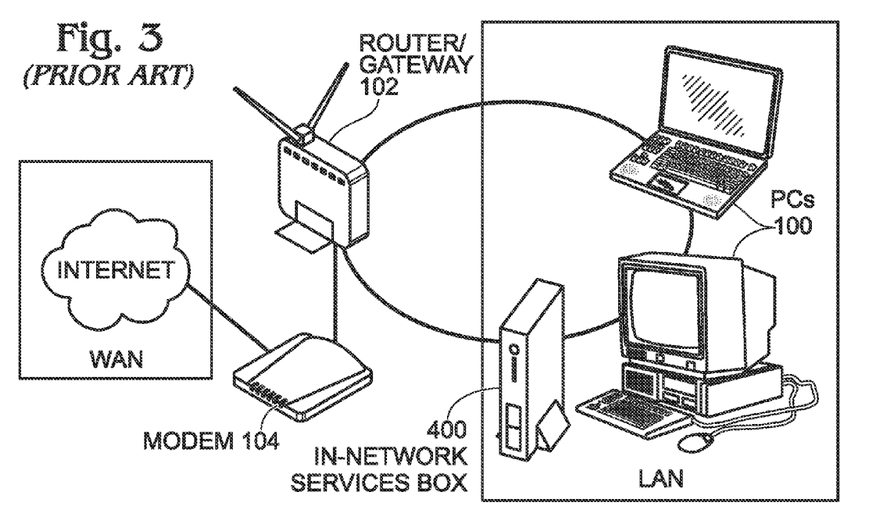
FIG. 3 is a schematic block diagram depicting a third option for adding services to the basic home network of FIG. 1 (prior art).

FIG. 3 is a schematic block diagram depicting a third option for adding services to the basic home network of FIG. 1 (prior art). In this aspect, an inline service box 400 (e.g., a NAS) is added to the LAN. Because the service box in part of the LAN, it can provide an in-network service (e.g., NAS), but it cannot provide additional inline security.

Figure 4:
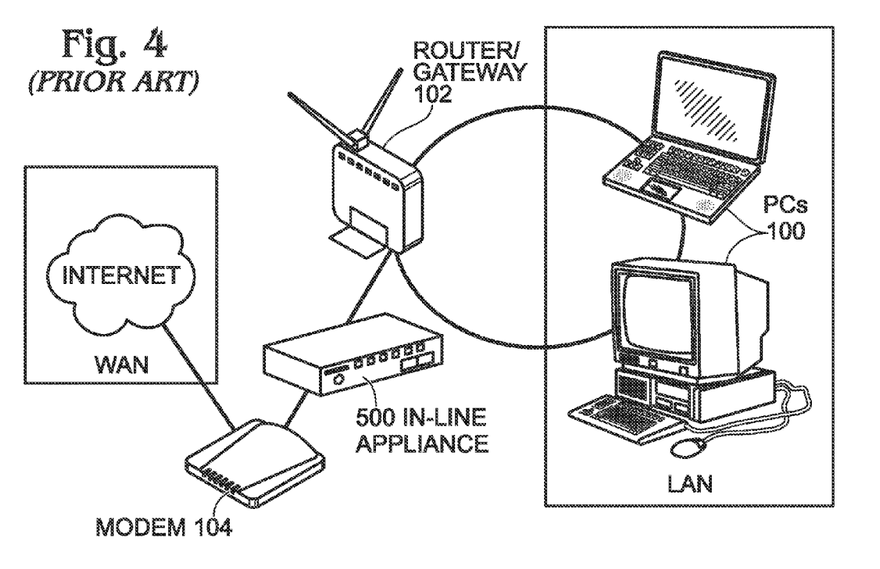
FIG. 4 is a schematic block diagram depicting a fourth option for adding services to the basic home network of FIG. 1 (prior art).

FIG. 4 is a schematic block diagram depicting a fourth option for adding services to the basic home network of FIG. 1 (prior art). In this aspect, an inline appliance 500 is added between the router 102 and the modem 104. The inline appliance 500 can supply additional inline security. However, because the appliance 500 is on the other side of the router firewall from the LAN, it cannot provide service (e.g., NAS) for LAN network PCs 100 using built-in windows clients.

Figure 5:
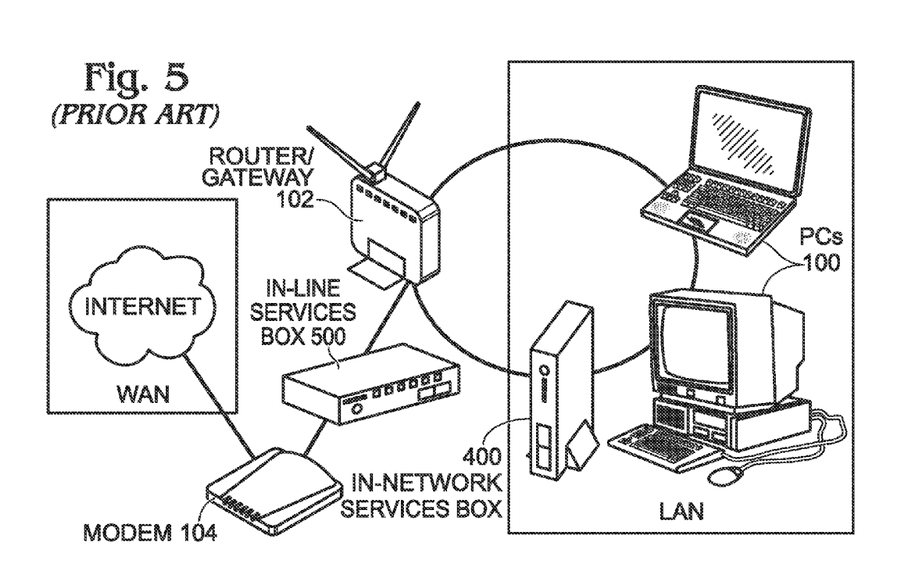
FIG. 5 is a schematic block diagram depicting a fifth option for adding services to the basic home network of FIG. 1 (prior art).

FIG. 5 is a schematic block diagram depicting a fifth option for adding services to the basic home network of FIG. 1 (prior art). In this aspect, an inline box 500 provides additional inline security (500) and an in-network box 400 provides LAN services. However, 3 boxes are too expensive and too complicated for home/SOHO users. Further, most home users would be unwilling to deal with multiple service providers.

It would be advantageous if an inline device existed that would provide the security of the conventional inline arrangement of router and modem, while selectively permitting remote clients connected via a WAN to bypass the router in accessing the LAN.

SUMMARY OF THE INVENTION

Accordingly, a method disclosed herein provides both inline services and in-network services, for a dual-connect service box interposed between a modem and a router. The method transceives communications between a service box wide area network (WAN) port and a local area network (LAN) port of a WAN-connected broadband modem. The method transceives communications between a service box WAN-proxy port and a WAN port of a router. The method also selectively transceives communications between the service box WAN port and a LAN port.

In one aspect, a service box binding module monitors messages transceived between the router and the modem to determine the service box WAN IP address, and registers at least one service box WAN IP addresses with a WAN network-connected account server. In another aspect, the binding module uses a dynamic host configuration protocol (DHCP) request to the router to obtain a service box LAN IP address The method selectively transceives communications between the service box WAN port and the LAN port in response to an authentification means, which may involve a binding module identifying an authorized port number in the communications, identifying an authorized command in the communications, or a combination of the above-noted means. The binding module transceives authorized communications from a remote client, between the WAN port and the LAN port, with the communications being addressed to the service box WAN IP address and including a command specifying a service type to be performed by a service box-external LAN agent embedded in a connected LAN network. The binding module also determines the IP addresses of LAN agents associated with supported services.

Additional details of the above-described method and a dual-connect service box for providing both inline services and in-network services, are provided below.

DETAILED DESCRIPTION

As used in this application, the terms "component," "module," "system," and the like are intended to refer to a computer-related entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Figure 6:
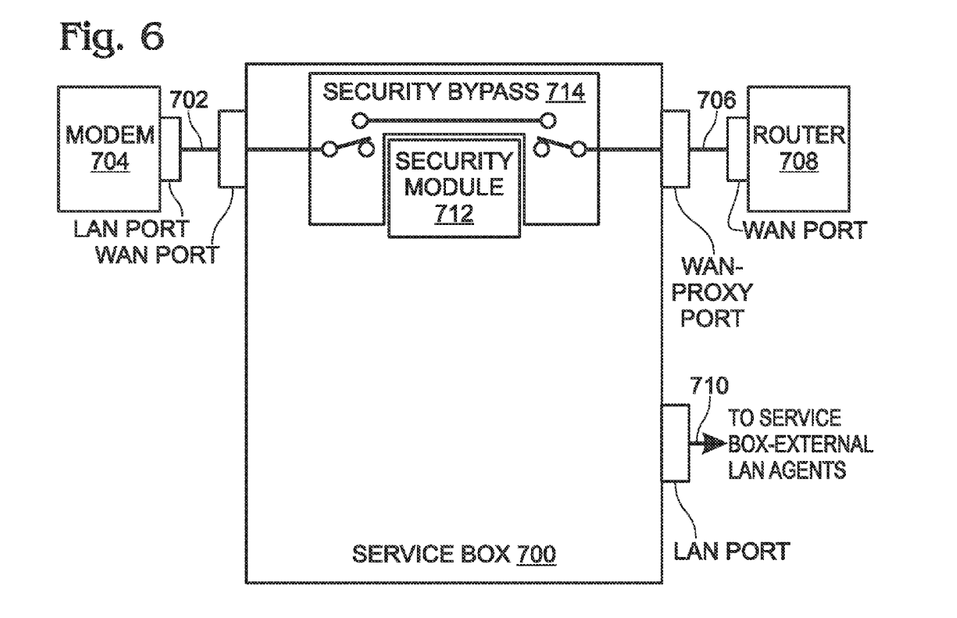
FIG. 6 is a schematic block diagram of a dual-connect service box for providing both inline services and in-network services.

FIG. 6 is a schematic block diagram of a dual-connect service box for providing both inline services and in-network services. The service box 700 comprises a wide area network (WAN) port on line 702 for transceiving communications with a local area network (LAN) port of a WAN-connected broadband modem 704. A WAN-proxy port on line 706 transceives communications with a WAN port of a router 708. The service box 700 also comprises a LAN port on line 710 for selectively transceiving communications with the WAN port on line 702, as explained in more detail below.

In one aspect, a security module 712 is interposed between the service box WAN-proxy port and the WAN port, for analyzing communications transceived between the router 708 and the broadband modem 704. The security module 712 may optionally performs a function such as firewall protection, virus scanning, content inspection uniform resource locator (URL) filtering, virtual private network (VPN) tunneling, or intrusion prevention system (IPS) protection, to name a few examples. Advantageously, some, none, or all of the security features may be selectively engaged. These features, if selected, are intended to augment the security functions provided by a conventional router. The optional use of the security module is enabled through the security bypass circuit 714.

Figure 7:
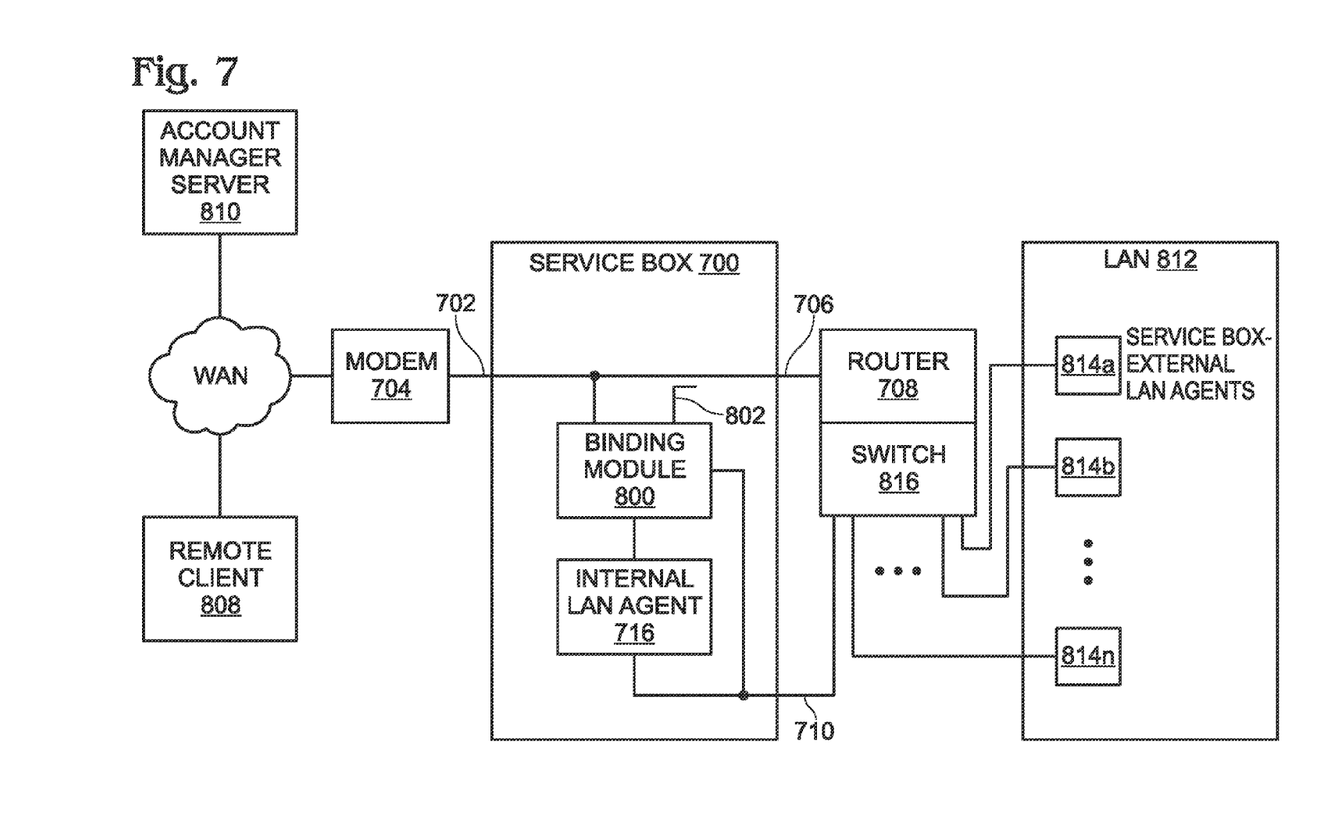
FIG. 7 is a schematic block diagram depicting additional details of the service box of FIG. 6.

FIG. 7 is a schematic block diagram depicting additional details of the service box of FIG. 6. In this aspect, the service box 700 comprises a binding module 800 monitoring messages transceived between the router and the modem on line 802 to determine the service box WAN IP address. For simplicity, the security module is not shown. However, it should be understood that the service box may include both a binding module 800 and a service module. An internal LAN agent 716 is interposed between the binding module 800 and the LAN port on line 710. The LAN port can be a wired or wireless connection interface. Typically, both wired and wireless interfaces are provided. Although LANs are explicitly described, it should be understood that the service box may alternately be connected to personal area networks (PANs) as well.

Knowing the service box WAN IP address permits the binding module to register at least one service box WAN IP address with a WAN network-connected account server 810. In one aspect, the binding module 800 initiates account maintenance messages with the account manager server 810, for dynamically updating service box WAN IP addresses. The binding module 800 uses a dynamic host configuration protocol (DHCP) request to the router 708 to obtain the service box LAN IP address.

The internal LAN agent 716 is interposed between the binding module 800 and the LAN port on line 710. The internal LAN agent 716 is typically enabled as a sequence of software instructions stored in a computer-readable memory (not shown) and executed by a processor (not shown). The internal LAN agent has the responsibility for communicating with the service box-external LAN agents 814. As shown, the LAN port on line 710 is connected to the multiport switch portion of the router 708 (the LAN ports of the router). As is well known in the art, devices connected in parallel on such a switch are able to communicate while bypassing the conventional router functions that act to separate the LAN ports from the WAN port.

Figure 8:
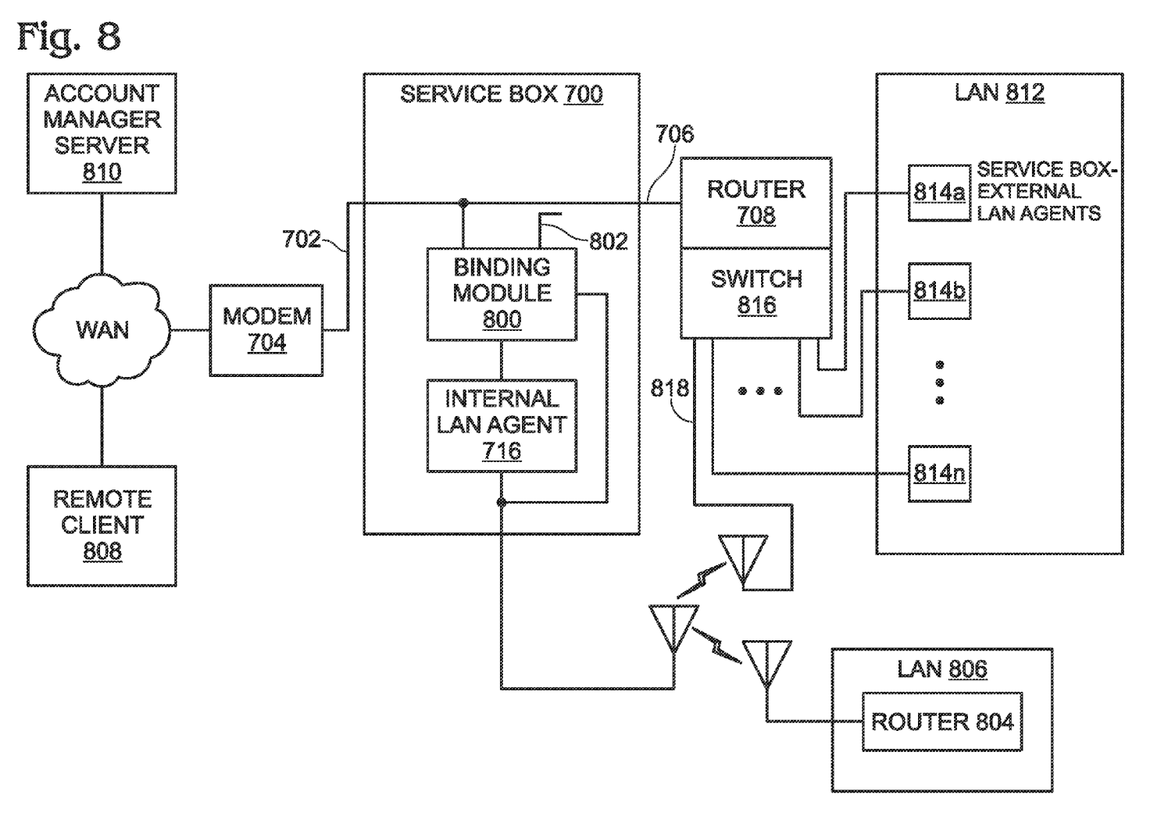
FIG. 8 is a schematic block diagram depicting a variation of the service box of FIG. 7.

FIG. 8 is a schematic block diagram depicting a variation of the service box of FIG. 7. In this case the service box LAN port is wireless connected to the router switch 816 via wireless connection 818. Note, although hardwired connected are shown between the switch 816 and the LAN 812, it should be understood that these connections may be wireless or a combination of wired and wireless connections.

It is possible for the binding module 800 to inadvertently connect to an out-of-network router via a wireless LAN interface 710. As shown, the binding module 800 is able to communicate with router 804 in LAN 806. The binding module 800 is able to determine if a router is connected to the service box WAN-proxy port on line 706 by sending a first message to the router with the service box LAN IP address as an IP source and the service box WAN IP address as an IP destination. If the first message is received at the service box WAN IP address within a predetermined period of time, the router is connected on line 706. If a time-out occurs before the first message is received, it can be assumed that a router is not connected on line 706.

More explicitly, a LAN port IP address is obtained from the router. A message is sent to the router with the obtained service box LAN IP address as an IP source and the service box WAN IP address as an IP destination. A time-out period is started. If the message is received back by the service box within a predetermined period of time, the services box concludes that the router is connected on line 706. If a time-out occurs and the message has not been received, it can be assumed that a router is not connected on line 706.

In case the service box 800 utilizes the wireless LAN port connectivity to connect to a wireless router, and the router connected to its WAN-proxy port has a wireless security feature enabled, then above steps fail in establishing the wireless connection with the local router until the service box submits a connectivity request with a security key, for example, a Wired Equivalent Privacy (WEP) security key.

The service box may post a request at the associated account administrator to request the WEP key for router 708. Once the WEP key is entered by the administrator of the local network governed by the router 708, the server sends the WEP key to the service box through a server-to-service box message. The service box is then able to connect to all secure reachable routers using the WEP key provided by the server using the steps described above.

Figure 9:
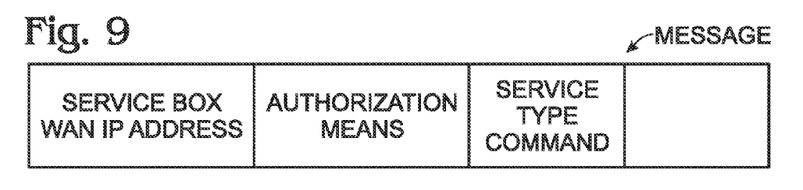
FIG. 9 is a diagram depicting an exemplary message sent to the service box by a remote client, requesting service.

FIG. 9 is a diagram depicting an exemplary message sent to the service box by a remote client, requesting service. Contrasting FIGS. 7, 8, and 9, the binding module 800 identifies authorized communications in response to identifying an authorized port number in the communications, identifying an authorized command in the communications, or a combination of the above-noted means. The binding module 800 transceives authorized communications from a remote client 808, between the WAN port on line 702 and the LAN port on line 710. These communications are addressed to the service box WAN IP address and include a command specifying a service type to be performed by a LAN agent.

The LAN port on line 710 is connected to one or more service box-external LAN agents. As shown, the LAN port on line 710 is shown connected to LAN 812 with service box-external LAN agents 814. Shown are external LAN agents 814a through 814n, where n is a variable not limited to any particular value. Some examples of service box-external LAN agents include a network attached storage (NAS) module, personal computer, server, printing device, to name a few. As is understood in the art, a NAS is file-level computer data storage device connected to a computer network, providing data access to heterogeneous network clients. The binding module 800 determines the IP addresses of service box-external LAN agents 814 associated with supported services. For example, uPnP (Universal Plug-n-Play) protocols can be used. Once communications from a remote client are authenticated and the service type identified, the binding module to able to direct the service request to the appropriate LAN agent IP address.

Figure 10:
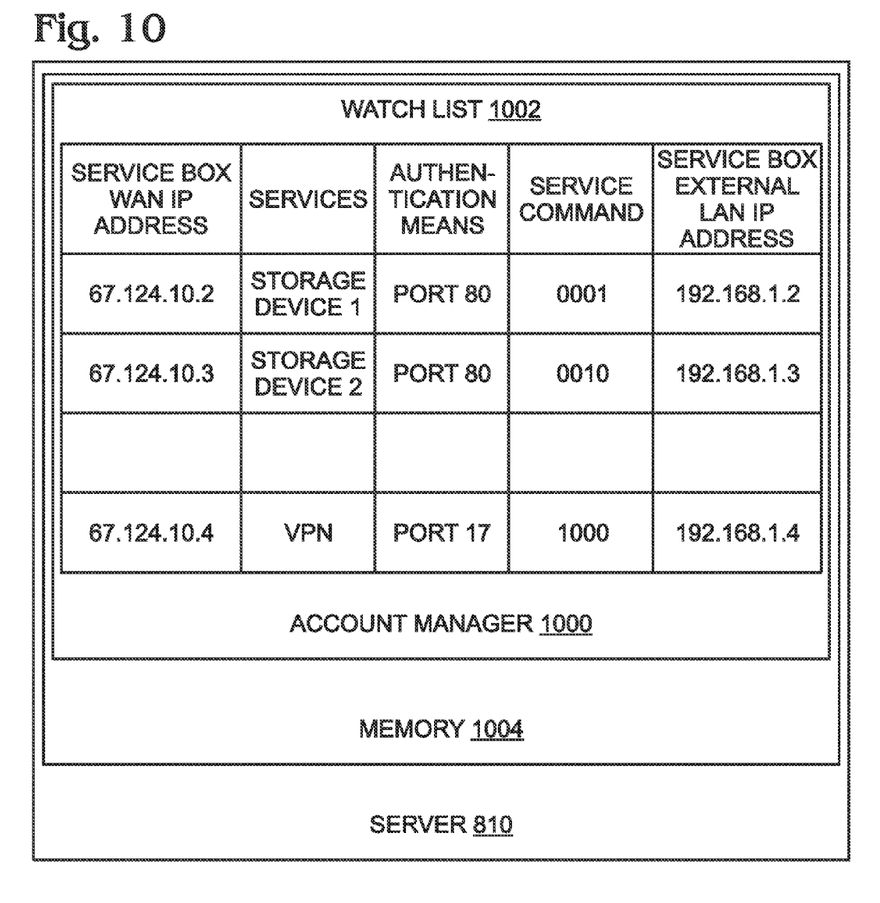
FIG. 10 is a schematic block diagram showing details of the account manager server of FIGS. 7 and 8.

FIG. 10 is a schematic block diagram showing details of the account manager server of FIGS. 7 and 8. The account manager 1000 is embedded in a WAN network-connected server 810. The account'manager 1000 maintains a watch list 1002 in memory 1004 of service box IP addresses cross-referenced to enabled services, service commands, authentication means, and service box-external LAN IP addresses. The first two IP addresses shown are associated with the service box of FIG. 7 or 8 (service box 700). In this aspect, each address is associated with a different service, but they both use the same authentication means. Alternately but not shown, the service box may have only one IP address, but the different service types may be distinguished by different authentication means.

The account manager can also be used to track billing information for provided serves, and to access history information. The billing may also be a function of some bandwidth usage. The remote client can access the account manager via a URL link from a conventional browser. Once inside the account manager website, the remote client can select a service or domain name from a menu. If the remote client is allowed, the menu selection may lead to the automatic submission of a request to the service box WAN IP address, along with the authentication means and the service command. With this information, the remote client can establish communications with a LAN agent, via the service box. Alternately, the services box is accessed from a remote client using a service box-specific client, which is a custom protocol for communication between the client and services box.

It should be understood that some components of the above-described service box may be enabled as a list of software instructions stored in a computer-readable memory and executed by a processor. The operation of computer systems able to read and process software applications is well understood in the art, and details a computer system sufficient to enable a software application are omitted in the interest of brevity.

Functional Description

The above-described service box provides both inline security and always-on LAN services (e.g., VPN or NAS). This design permits a conventional router to be used, with no router dependency on external services, and without the need to make any configuration changes to the router.

The mechanism for auto-binding a service box WAN IP address to the associated web account is as follows. First, the inline (WAN-proxy) port of the service box is connected to the "modem" port of the router/gateway and the WAN port of the service box to the modem LAN port. A services management website associated with one of the service providers (e.g., www.apmservices.com) is accessed to start the process of creating a services subscription account. A list of all approved services providers is registered with the service box provider. The service box tracks messages (content inspection) to any of the programmed candidate web sites. During bring-up, the service box resolves the programmed URL addresses to associated IP addresses (from a known IP address for the DNS server) or IP addresses of approved services web sites may themselves be programmed in the service box. The service box also connects to its own website for auto management functions. Based on the tracking of messages to the programmed services website, the service box determines with which account on the site it should associate itself. The service box binds its WAN IP address to the services account. Binding is accomplished by sending a "binding" message to the services web site with the account number to bind. The service box periodically reconfirms the WAN IP address and keeps the association of account and LAN IP address current.

If the service box is connecting to a wireless router, the following additional steps are performed during the initial account creation phase. First, the service box monitors all reachable local area Wireless (WiFi) networks. For each reachable unsecure router, the service box sends a series of packets with randomly generated data to a well known address, say the service box's service provider's web address. The service box monitors whether the series of packets with the same data pass through the inline connection within a timeout period. If the data sequence is not detected within a short timeout period, the targeted router is determined to be not connected locally to the service box.

If the local router has wireless security enabled (e.g., WEP security or another security type well known in the art), then the above-mentioned steps will fail for all of the candidate unsecure routers. At this stage, on the account creation page, a query is made as to whether the local router is a wireless router. In case the local router is a wireless router, a follow-on question is asked to enter the WEP key. If the local router is not a wireless router, then on the account page a suggestion is made to connect the 3rd port, the WAN-proxy port of the service box, to one of the network ports of the router. If the local router is a wireless router with WEP security, then using the provided WEP key, the service box repeats the data monitoring steps described above, for all WEP enabled routers that can be reached. The service box binds itself to the candidate router for which the inline path presents same data as the data sent over the in-network wireless path. If the step does not succeed, an error is reported and a physical wire connection between the in-network service box and router network is suggested.

Figure 11:
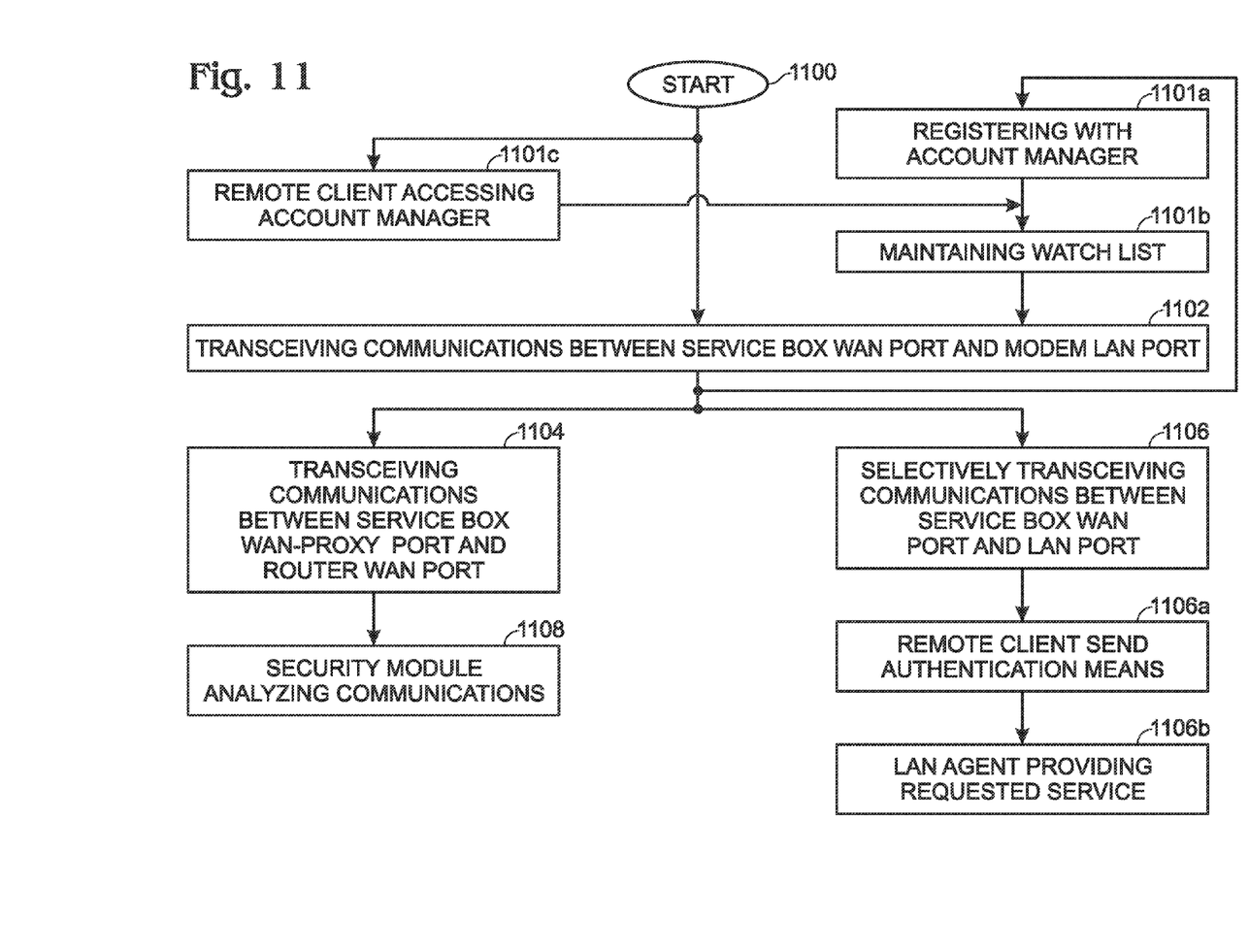
FIG. 11 is a flowchart illustrating a method for providing both inline services and in-network services in a dual-connect service box interposed between a modem and a router.

Alternately, the service box may display the list of all of reachable routers on the services website as part of the account creation page. The user selects which of the routers is the local router, including providing the WEP key if needed. Then, the service box performs the data monitoring steps to validate that the selected router is indeed a local router and that it can establish the connection successfully. If the step does not succeed, an error is reported and a physical wire connection between the in-network service box and router network is suggested FIG. 11 is a flowchart illustrating a method for providing both inline services and in-network services in a dual-connect service box interposed between a modem and a router. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 1100.

Step 1102 transceives communications between a service box wide area network (WAN) port and a local area network (LAN) port of a WAN-connected broadband modem. Step 1104 transceives communications between a service box WAN-proxy port and a WAN port of a router. Step 1106 selectively transceives communications between the service box WAN port and a LAN port. Steps 1104 and 1106 are shown as parallel operations, not necessarily because the operations are performed simultaneously, but more usually, because the method selects one of the alternate paths. In Step 1108 a service box security module, interposed between the service box WAN-proxy port and the WAN port, analyzes communications transceived between the router and the broadband modem, and optionally performs firewall protection, virus scanning, content inspection uniform resource locator (URL) filtering, virtual private network (VPN) tunneling, or intrusion prevention system (IPS) protection. It should be noted that these security functions may be performed in addition to, and without interfering with any router security functions.

In one aspect, transceiving communications between the service box WAN port and the LAN port of the WAN-connected broadband modem includes a service box binding module monitoring messages transceived between the router and the modem to determine the service box WAN IP address. Once the service box WAN IP address is determined by the binding module, Step 1101a registers at least one service box WAN IP addresses with a WAN network-connected account manager server. Step 1101a may further include the binding module initiating account maintenance messages with the account manager, for dynamically updating the service box WAN IP address.

In another aspect, transceiving communications between the service box WAN-proxy port and the WAN port of the router (Step 1104) includes the binding module using a dynamic host configuration protocol (DHCP) request to the router to obtain a service box LAN IP address. Further in Step 1104, the binding module may determine IP addresses of service box-external LAN agents associated with supported services.

In Step 1101b an account manager embedded in a WAN network-connected server maintains a watch list of service box WAN IP addresses cross-referenced to enabled services, service commands, service box-external LAN IP addresses, and authentication means. In Step 1101c a remote client accesses the account manager to acquire an authentication means and service command. Then, selectively transceiving communications between the service box WAN port and the LAN port in Step 1106 includes substeps. In Step 1106a the remote client sends communications to the service box WAN IP address with the embedded authentication means. In Step 1106b a service box-external LAN agent embedded in a connected LAN network provides a requested service to the remote client.

In another aspect, selectively transceiving communications between the service box WAN port and the LAN port in Step 1106 includes the binding module identifying authorized communications in response to an authentification means, which can involve identifying an authorized port number in the communications, identifying an authorized command in the communications, and a combination of the above-noted means. Further in Step 1106, the binding module transceives authorized communications from a remote client, between the WAN port and the LAN port, in which the communications being are addressed to the service box WAN IP address and include a command specifying a service type to be performed by a service box-external LAN agent.

In a different aspect, transceiving communications between the service box WAN-proxy port and the WAN port of a router in Step 1104 includes the binding module determining if a router is connected to the service box WAN-proxy port by: sending a first message to the router with the service box LAN IP address as an IP source and the service box WAN IP address as an IP destination; and, receiving the first message at the service box WAN IP address within a predetermined period of time.

A system and method have been provided for providing both inline and in-network services. Specific device components and processes have been used as examples to illustrate the invention. However, the invention is not limited to merely these examples. Other variations and embodiments of the invention will occur to those skilled in the art.

We claim:

1. A dual-connect service box for providing both an inline service and an in-network service, the dual-connect service box comprising:
   a first wide area network (WAN) port configured to transceive communications with a first local area network (LAN) port of a WAN-connected broadband modem;
   a WAN-proxy port configured to transceive communications with a second WAN port of a router;
   a second LAN port configured to selectively transceive communications with the first WAN port;
   a binding module configured to monitor messages transceived between the router and the WAN-connected broadband modem to determine a WAN Internet Protocol (IP) address of the dual-connect service box; and
   a security module interposed between the WAN-proxy port and the first WAN port configured to analyze communications transceived between the router and the WAN-connected broadband modem,
   wherein the security module is configured to perform at least one of firewall protection, virus scanning, content inspection uniform resource locator (URL) filtering, virtual private network (VPN) tunneling, or intrusion prevention system (IPS) protection.

2. The dual-connect service box of claim 1, wherein the second LAN port is at least one of a wired connection interface or a wireless connection interface.

3. The dual-connect service box of claim 1, wherein the binding module is further configured to register the WAN IP address of the dual-connect service box with an account manager server communicatively connected to the WAN-connected broadband modem over a WAN.

4. The dual-connect service box of claim 1, wherein the binding module is further configured to use a dynamic host configuration protocol (DHCP) request to the router to obtain a LAN IP address of the dual-connect service box.

5. The dual-connect service box of claim 4, wherein the binding module is further configured to determine whether the router is connected to the WAN-proxy port by:
   sending a first message to the router with the LAN IP address of the dual-connect service box as an IP source and the WAN IP address of the dual-connect service box as an IP destination; and
   receiving the first message at the WAN IP address of the dual-connect service box within a defined period of time after the sending.

6. The dual-connect service box of claim 1, wherein the binding module is further configured to determine an IP address of a LAN agent associated with a supported service.

7. The dual-connect service box of claim 6, wherein the binding module is further configured to identify an authorized communication in response to an authentification means, wherein the authentification means is at least one of identification of an authorized port number in the communication or identification of an authorized command in the communication.

8. The dual-connect service box of claim 7, wherein the binding module is further configured to transceive an authorized communication from a remote client between the first WAN port and the second LAN port, the authorized communication being addressed to the WAN IP address of the dual-connect service box and including a command specifying a service type to be performed by a service box-external LAN agent.

9. The dual-connect service box of claim 1, wherein the binding module is further configured to initiate an account maintenance message with an account manager server, wherein the account maintenance message is configured to update the WAN IP address of the dual-connect service box.

10. The dual-connect service box of claim 8, further comprising:
    an account manager embedded in a WAN network-connected server, the account manager configured to maintain a watch list of service box IP addresses cross-referenced to at least one enabled service, at least one service command, or at least one authentication means.

11. The dual-connect service box of claim 1, further comprising:
    an internal LAN agent interposed between the binding module and the second LAN port, wherein the internal LAN agent is configured to communicate, via the second LAN port, with a service box-external LAN agent embedded in a LAN network, and wherein the service box-external LAN agent is at least one of a network attached storage (NAS) module, a personal computer, a server, or a printing device.

12. A method for providing both an inline service and an in-network service in a dual-connect service box interposed between a WAN-connected broadband modem and a router, the method comprising:
    transceiving communications between a service box wide area network (WAN) port and a local area network (LAN) port of the WAN-connected broadband modem;
    transceiving communications between a service box WAN-proxy port and a WAN port of the router;

monitoring messages transceived between the router and the WAN-connected broadband modem to determine a WAN Internet Protocol (IP) address of the dual-connect service box;

selectively transceiving communications between the service box WAN port and a service box LAN port; and analyzing communications transceived between the router and the WAN-connected broadband modem using a service box security module interposed between the service box WAN-proxy port and the service box WAN port, wherein the analyzing comprises performing at least one of firewall protection, virus scanning, content inspection uniform resource locator (URL) filtering, virtual private network (VPN) tunneling, or intrusion prevention system (IPS) protection.

13. The method of claim 12, further comprising:
registering the WAN IP address of the dual-connect service box with a WAN network-connected account manager server.

14. The method of claim 12, wherein the transceiving communications between the dual-connect service box WAN-proxy port and the WAN port of the router comprises sending a dynamic host configuration protocol (DHCP) request to the router to obtain a LAN IP address of the dual-connect service box.

15. The method of claim 12, wherein the selectively transceiving communications between the service box WAN port and the service box LAN port includes identifying an authorized communication in response to an authentification means, wherein the authentification means comprises at least one of identifying an authorized port number in the authorized communication or identifying an authorized command in the authorized communication.

16. The method of claim 15, wherein the selectively transceiving communications between the service box WAN port and the service box LAN port includes transceiving the authorized communication from a remote client between the service box WAN port and the service box LAN port, wherein the authorized communication is addressed to the WAN IP address of the service box and includes a command specifying a service type to be performed by a service box-external LAN agent.

17. The method of claim 13, wherein the registering the WAN IP address of the dual-connect service box comprises initiating an account maintenance message with the account manager server to facilitate, dynamically updating the WAN IP address of the dual-connect service box.

18. The method of claim 13, wherein the transceiving communications between the service box WAN-proxy port and the WAN port of the router comprises determining an IP address of a service box-external LAN agent associated with at least one supported service.

19. The method of claim 15, further comprising:
maintaining, by an account manager embedded in a WAN network-connected server, a watch list of service box WAN IP addresses cross-referenced to one or more enabled services, one or more service commands, or one or more authentication means; and providing an authentication means and a service command to a remote client accessing the account manager;

wherein the selectively transceiving communications between the service box WAN port and the service box LAN port includes:

receiving a communication from the remote client at the WAN IP address of the dual-connect service box, wherein the communication from the remote client includes the embedded authentication means; and providing a requested service to the remote client in response to the communication from the remote client.

20. The method of claim 12, wherein the transceiving communications between the service box WAN-proxy port and the WAN port of the router comprises determining whether the router is connected to the service box WAN-proxy port by:

sending a first message to the router with the LAN IP address of the dual-connect service box as an IP source and the WAN IP address of the dual-connect service box as an IP destination; and receiving the first message at the service box WAN IP address within a defined period of time after the sending.

21. The dual-connect service box of claim 11, wherein the internal LAN agent is configured to communicate with the service box-external LAN agent via a switch portion of the router.

* * * * *